Figure 1:
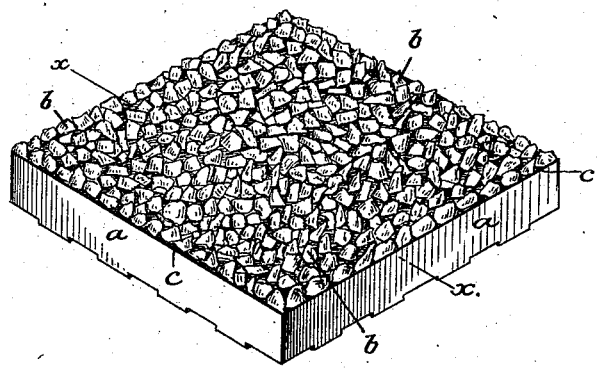

(No Model.)

G. DE FESTETICS.
ARTISTIC TILE.

No. 293,636. Patented Feb. 19, 1884.

Attest:
Joseph S. Michael
Joseph B. Lyman

Inventor
Gyula de Festetics
By James A. Hudson
Atty

UNITED STATES PATENT OFFICE.

GYULA DE FESTETICS, OF PERTH AMBOY, NEW JERSEY.

ARTISTIC TILE.

SPECIFICATION forming part of Letters Patent No. 293,636, dated February 19, 1884.

Application filed January 16, 1884. (No model.)

*To all whom it may concern:*

Be it known that I, GYULA DE FESTETICS, a citizen of the United States, and a resident of Perth Amboy, in the county of Middlesex and State of New Jersey, have invented a new and useful Improvement in Artistic Tiles, of which the following is a specification.

My invention has for its object the production of artistic tiles having their upper surfaces composed of vitreous, crystalline, or irregular masses adhering to a clay body through the medium of a vitreous flux, in which they are to a greater or less extent, or even wholly, embedded; and it consists in the process of the manufacture and resultant effect—physical as well as optical—produced by the combination of such a clay body and crystals or crystalline masses, herein fully described and claimed.

In the drawings, similar letters of reference indicate corresponding parts, so far as shown in the several figures.

Figure 2:
Figure 3:
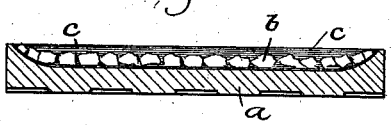
Figure 4:
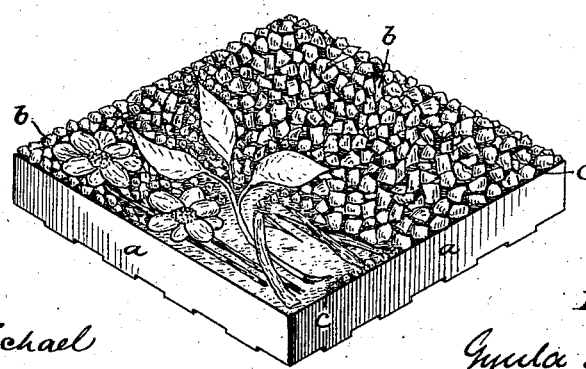

Figure 1 illustrates in perspective a tile embodying my invention. Fig. 2 is a section through $x\ x$, Fig. 1. Fig. 3 shows in section a modification of Fig. 2, and Fig. 4 shows in perspective still other modifications.

$a\ a\ a$ is the clayey body of the tile, and $b\ b\ b$ are crystalline or irregular masses superimposed and held in place by the vitreous flux $c\ c\ c$.

To carry my invention into practice, I prepare a tile from any ordinary clay mixture suitable for a tile-body, and treat it in the ordinary way until it reaches the condition known as "biscuit," and then, after it has become sufficiently cold for comfortable handling, I apply to its upper surface any ordinary glazing-flux, either in pasty or powdered form, and into this glazing material, or into parts of it, I then embed, to a greater or less extent, the crystals or crystalline masses in such relative positions toward each other and of such size or sizes as fancy may suggest. The tile is then ready for its second firing—in the vernacular of the trade, "firing for glaze"—and must be fired sufficiently to liquefy the "flux," which, on cooling, will then securely hold the crystalline masses in place upon the tile-body and complete the production. In such case the relative properties or characteristics of the flux and of the crystals or crystalline masses must be such that the latter will not be melted by the degree of heat to which they are exposed while fusing the flux.

By careful management, due regard being had to the relative characteristics of the clay body, the fluxing material, and the crystalline masses, the "firing to biscuit" may be dispensed with as a separate operation, and the treatment herein described as pursued from the biscuit state may be pursued from the clay state of the tile-body, and into it the crystals or crystalline masses may be, to some extent, impressed, to give a more solid setting and varying effect. Indeed, it is possible to impress the crystals into the clay body while that body is in process of manufacture; but this is somewhat difficult, and is likely to be followed by great loss of the goods in firing. When a smoother surface effect is desired, the flux and crystals or crystalline mass material employed may be made fusible at more nearly the same degree of heat, so that the latter will become partially or surface fused; or they may be coated over with the flux material; or, if a flat surface be desired, the clay body may be provided with a rim, as shown in Fig. 3, and the crystals set upon its depressed surface and entirely submerged in a transparent flux.

As artistic effects are important, it is suggested that the crystals or crystalline masses employed may not only be of varying sizes and forms, but also of varying colors; that but parts of the tile may be covered by them, the other parts being ornamented or plain; that the fluxing material may be tinted or colored, and that still other pleasing effects may be obtained by deep depressions in parts of the tile-surface, thereby providing for partial or complete submergence of the crystals in a transparent or approximately transparent flux.

In the case of entire submergence, the tile should be fired in a horizontal position. When the submergence is but partial, a different artistic effect will be produced by every change in the position in which the tile is fired.

I claim as new and desire to secure by Letters Patent—

1. As a new article of manufacture, an artistic tile consisting of a clay body with superimposed crystals or vitreous masses thereon, secured through the medium of a fluxing material, as described.

2. The herein-described method of producing artistic tiles, consisting in the application upon the surface of the clay body of a fluxing material and crystals or vitreous masses and uniting the whole by means of heat, substantially as described.

In testimony that I claim the foregoing as my invention I have signed my name, in presence of two witnesses, this 12th day of January, 1884.

GYULA DE FESTETICS.

Witnesses:
   JOSEPH S. MICHAEL,
   JOSEPH B. LYMAN.